United States Patent [19]

Bramlett

[11] 4,110,215

[45] Aug. 29, 1978

[54] LIQUID LEVEL CONTROL SYSTEM FOR SEPARATION TANK

[75] Inventor: David A. Bramlett, Tulsa, Okla.

[73] Assignee: Sun Oil Company of Pennsylvania, Philadelphia, Pa.

[21] Appl. No.: 668,871

[22] Filed: Mar. 22, 1976

[51] Int. Cl.² ............................................. B01D 33/38
[52] U.S. Cl. ...................................... 210/114; 210/121; 210/540
[58] Field of Search ................. 210/97, 109, 110, 114, 210/115, 121, 124, 128, 108, 220, 532, 533, 534, 535, 536, 540

[56] References Cited

U.S. PATENT DOCUMENTS

| | | | |
|---|---|---|---|
| 1,500,669 | 7/1924 | Cunningham | 210/121 |
| 2,723,760 | 11/1955 | Talbot | 210/542 X |
| 2,789,090 | 4/1957 | Guillerd et al. | 210/540 X |
| 3,298,529 | 1/1967 | Longnecker | 210/533 |
| 3,495,712 | 2/1970 | Schreiber | 210/220 |
| 3,628,660 | 12/1971 | In't Veld | 210/110 |
| 3,733,263 | 5/1973 | Mandt | 210/220 |
| 3,784,010 | 1/1974 | Barra | 210/128 |
| 3,799,344 | 3/1974 | Nishizawa | 210/128 |
| 3,971,719 | 7/1976 | Peters | 210/121 |
| 3,979,290 | 9/1976 | Loffler | 210/534 |

*Primary Examiner*—Theodore A. Granger
*Attorney, Agent, or Firm*—J. Edward Hess; Donald R. Johnson; Anthony Potts, Jr.

[57] ABSTRACT

An automatic liquid level control system for separation tanks which are used to clean waste water. The automatic level control system includes an external stilling well mounted on the side of the separation tank and having a liquid level sensing means which produces a pneumatic signal related to the liquid level. A pneumatic operator receives the pneumatic signal and maintains the proper position of the weir gate in the weir or outfall box of the separation tank, so that the amount of effluent water flowing from the tank is appropriately regulated to maintain the desired liquid level in the tank.

9 Claims, 2 Drawing Figures

LIQUID LEVEL CONTROL SYSTEM FOR SEPARATION TANK

BACKGROUND OF THE INVENTION

This invention relates to automatic liquid level control systems and more particularly to an automatic liquid level control system for use on an separation tank system.

Separation tanks are often used to separate pollutants from waste water discharges from industrial processes before the water is permitted to be discharged into a natural body of water. Obviously, it is desirable to operate these tanks in an efficient manner so that any possibility of polluting the nearby streams is minimized. One aspect of the separation tank operation which relates to its efficiency for controlling the quality of the effluent water discharged from the tank, is the maintenance of the liquid level within the tank within predetermined tolerances. Normally, this level control operation has been done manually. When influent flow rates remain constant or vary in a predictable manner, this particular method is adequate. However, there are often times when the influent flow rates can vary quite rapidly and unpredictably. These conditions require continuous monitoring of the liquid level within the separation tank so that the efficiency of the air flotation tank is maintained. It is therefore desirable to have an automatic system for controlling the liquid level to reduce the manpower requirement for operating separation tanks as well as to improve control over the process.

SUMMARY OF THE INVENTION

In accordance with a preferred embodiment, an automatic liquid level controller for a separation tank is provided. The control system uses an external stilling well mounted on the outside wall of the separation tank and having located therein a displacer which is interconnected with an air pressure regulator so that the air pressure of the regulator output is related to the position of the displacer in the external stilling well. The output pressure from the air pressure regulator is then used to operate a pneumatic actuator which controls the position of the weir gate within the weir box on the outside of the separation tank.

Also included in the liquid level control system is a linkage system for operating on the weir gate itself and an improvement in the weir gate design to enable it to be easily operated by the pneumatic operator.

Using an automatic level control system for the separation tank permits immediate actuation of the weir gate itself upon the sensing of rather small liquid level changes within the separation tank, so that optimum efficiency for cleaning the influent water passing through the tank is maintained. The use of the external stilling well minimizes the effect on the liquid level detection system caused by the turbulent flow within the tank itself.

A better understanding of this invention and its advantages can be seen in the following description of the figures and preferred embodiment.

DESCRIPTION OF THE DRAWINGS AND PREFERRED EMBODIMENT

The basic structure and operation of an separation tank will now be discussed. The separation tank is designed to receive an influent water discharge and separate the pollutants therein so that clean, effluent water can be discharged into nearby bodies of water without harm to the environment. The influent water can be that used within the refinery processes or other industrial processes as well as on-site drainage water which can accumulate the various pollutants which are often found around any industrial process. After the influent is introduced into the separation tank, the heavier contaminants are permitted to settle to the bottom and are discharged as sludge. The lighter pollutants, such as hydrocarbons, are permitted to float to the surface and are then skimmed off. The clean effluent water is discharged through a weir box or outfall box which also serves the purpose of maintaining the liquid level within the separation tank so that proper separation of the pollutants from the water can be achieved.

Figure 1:
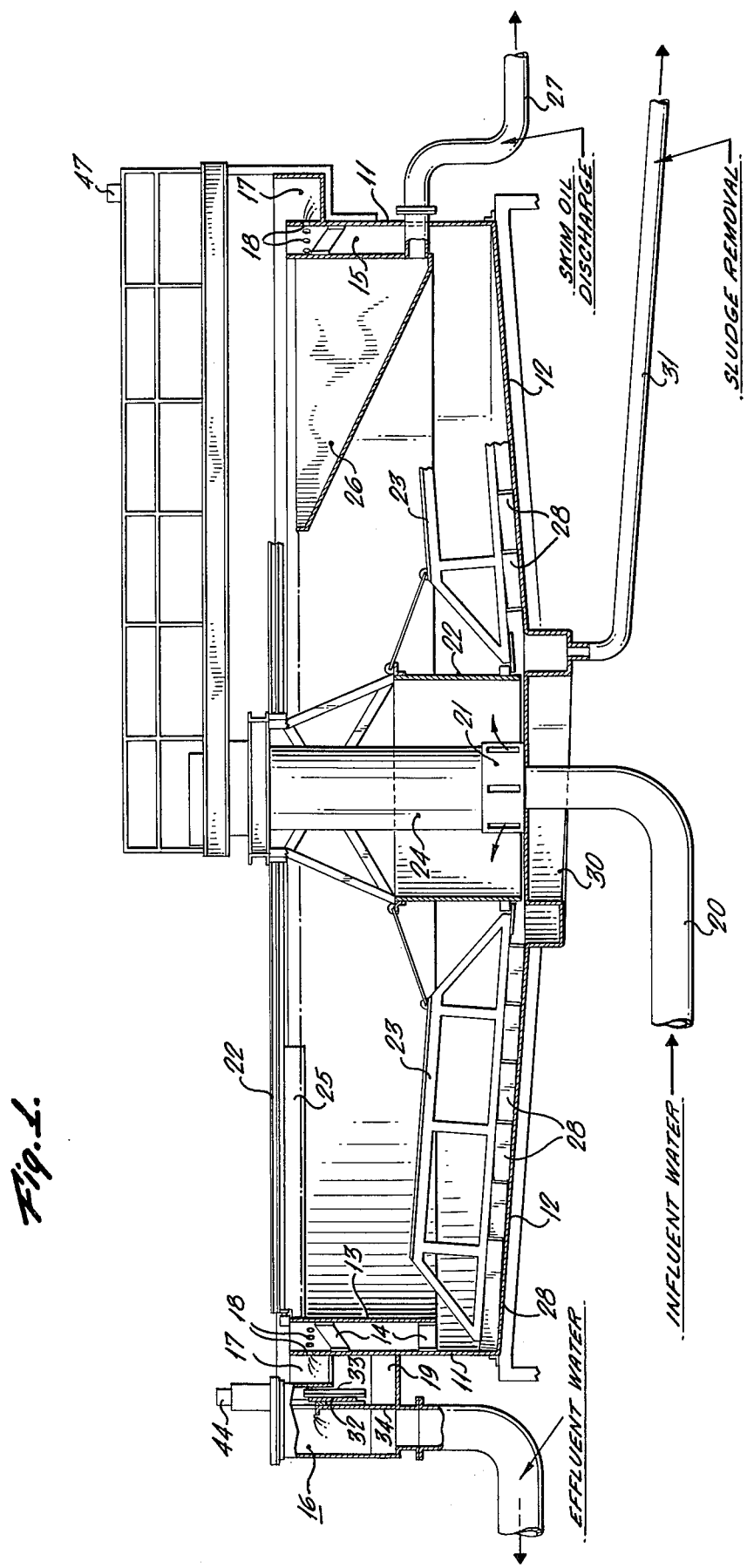
FIG. 1 illustrates schematically a sectional view of the separation tank with an automatically controlled weir gate system in accordance with this invention.

Referring to FIG. 1, the separation tank has an outer wall 11 and a bottom 12 which defines the tank enclosure. An inner wall 13, which is attached to the inside of outer wall 11 by supports 14, extends partially down the side of outer wall 11. On one side of the outer wall 11, a weir box or an outfall box 16 is provided to receive the effluent water from the tank and to control its eventual discharge. An annular trough 17, which is mounted around the outside of outer wall 11 and slopes downward to weir box 16, receives the effluent water collected between outer wall 11 and inner wall 13 in annular space 15 through a plurality of orifices 18 located near the top of outer wall 11. The effluent water in trough 17 enters inlet compartment 19 of weir box 16 in which the liquid level is maintained at a desired level by the position of weir gate 32.

The influent water flows into the tank through pipeline 20 and inlet section 21 at the center of the bottom 12 of the tank. To improve dispersion of the influent water, a feed well 22 surrounds inlet section 21, thereby assuring that the influent flows upward to the center portion of the tank to permit better distribution within the tank. Circulation of the water within the tank is provided by the rotation of a plurality of skimmers at the surface level and rakes at the lower level of the tank about center column 24. Skimmer 22 has a frame structure extending from center support column 24 out to the top edge of inner wall 13 which drags flexible members 25 across the surface level of the liquid so that the light pollutants floating at the surface level are directed into skim trough 26 for removal through exit pipeline 27. The heavier material within the influent water settles toward bottom 12 and are directed toward the center portion of the bottom by blades 28 of rake 23 where it is removed through drain section 30 and sludge removal line 31.

The cleaned water is then forced into annular space 15 between inner wall 13 and outer wall 11 where it is isolated from the turbulence within the inner section of the tank and any particulate matter therein is permitted to settle out further. The clean water at the top of annular space 15 flows into trough 17 through orifices 18 spaced around the circumference of outer wall 11. Trough 17 funnels the collected water to weir box 16 for collection and discharge. Included within weir box 16 is a weir gate 32 which controls the liquid level within inlet compartment 19 and the separation tank by virtue of its position. For proper operation of the separation tank, the weir gate should be positioned so that the liquid level inside the tank is maintained at a proper level to permit efficient removal of the pollutants floating on top of the water in the tank by skimmer 22 and trough 26. An automatic system for achieving this result will now be described.

Figure 2:
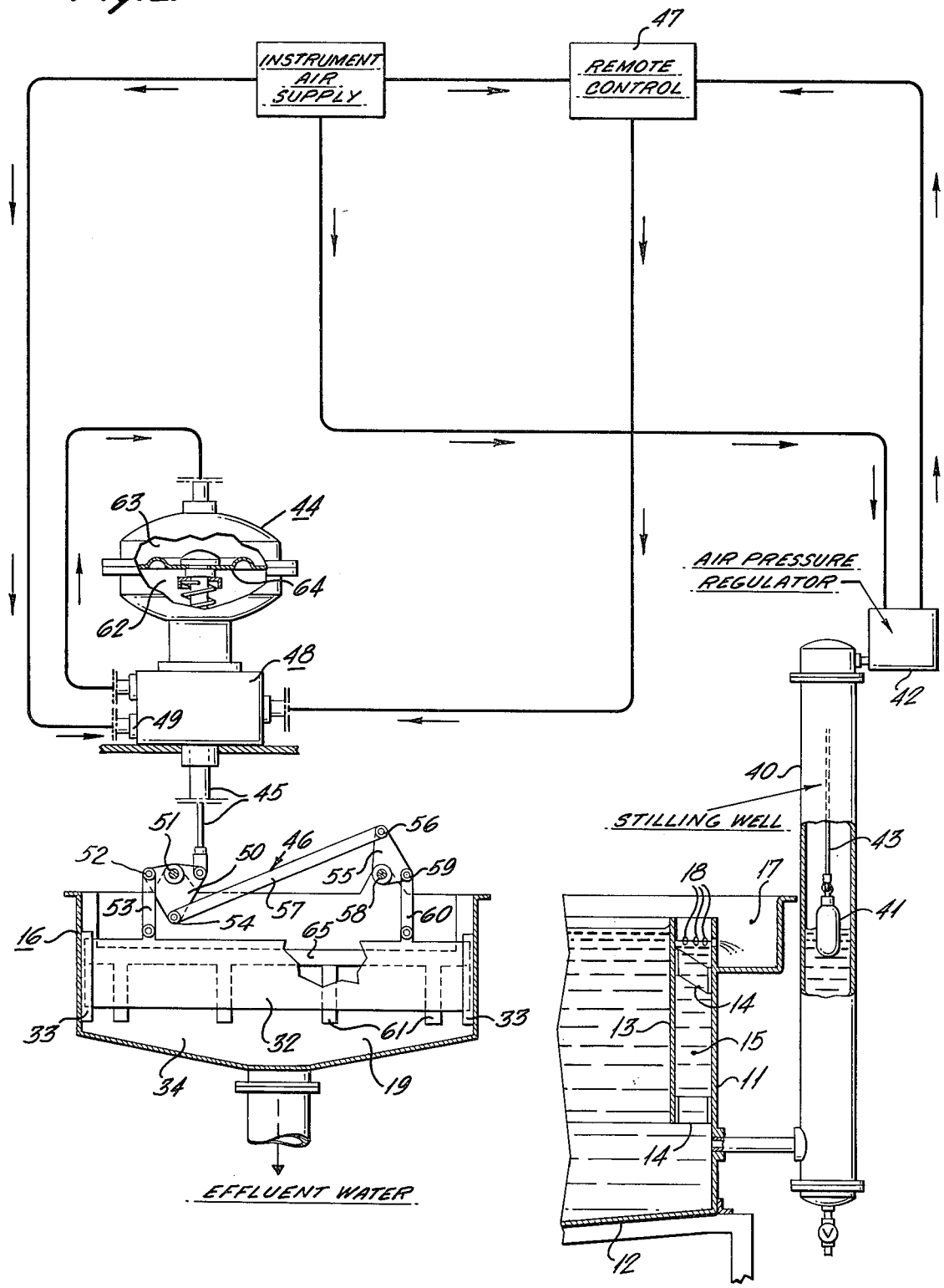
FIG. 2 illustrates in schematic form the automatic level control system for an separation tank in accordance with this invention.

Referring to FIG. 2, weir gate 32 is slidably positioned within weir box 16 between guides 33. The distance between the bottom of stationary plate 34 and the top of weir gate 32 determines the liquid level that will be maintained within inlet compartment 19 of weir box 16. Weir gate 32 is not tightly sealed against stationary plate 34 since the amount of water passing between the two as compared to the water flowing over the top of weir gate 32 is insignificant.

The control system for regulating the position of weir gate 32 uses a stilling well or sight gauge 40 mounted on the external wall 11 and positioned in a vertical direction so that the liquid level within the stilling well 40 is approximately the same as that within the tank. A displacer 41 is positioned to float within stilling well 40 and linked to air pressure regulator 42 by linking means 43. Regulator 42 is designed to receive an input air pressure and to produce an output pressure which is related to the position of displacer 41 within stilling well 40. Regulator 42 can be any of the conventional analog air pressure regulators available today such as that available from Fisher, type 2500-249BP. Use of the term "air pressure" in the specification and claims in intended to include atmospheric air under pressure as well as other fluids under pressure.

The output air pressure for regulator 42 is then fed to pneumatic operator 44 which produces a mechanical displacement of actuator member 45 which is related to the air pressure received from controller 42. Member 45 is then connected to weir gate 32 through a linkage system 46. Pneumatic operator 44 and linkage 46 are designed so that when displacer 41 detects the movement of the liquid level above a predetermined amount, the weir gate will be lowered a predetermined amount so that more water can be discharged from the tank to permit the water level within the tank to return to the desirable level. Likewise, when the water level within the tank falls below a predetermined amount, the weir gate will be raised to decrease the flow of water from the tank so that the liquid level can return to its desired position.

Other variations may be desirable for this basic design. Often it is desirable to remotely control the exact position of weir gate 32. To provide this capability, a remote control element 47 can be mounted in line with the output air pressure feed of regulator 42 to pneumatic actuator 44. Remote control operator 47 permits the pressure entering actuator 44 to be manually controlled, both for the purpose of adjusting the automatic control of the position of weir gate 32 as well as to override the automatic control system. Controlling systems which will provide this function are readily available to those skilled in the art and an example of such a system is that available from Fisher, identified by the No. 2516.

Pneumatic operator 44 can generally consist of a conventional structure having two chambers separated by a diaphragm which is displaced toward the chamber having the least pressure. One chamber is maintained at an essentially constant pressure and serves as a reference, such as chamber 62 in FIG. 2. Chamber 63 receives the air pressure signal from regulator 42, which causes diaphragm 64 and member 45 to be displaced according to the relative difference of pressures in chambers 62 and 63.

To obtain a better response time for pneumatic actuator 44, a valve positioner system 48 can be included within the installation of actuator 44. Valve positioner 48 receives a constant supply of air at input 49 which can be adjusted to apply a pressure to chamber 63 inside pneumatic operator 44 which is related to the input pressure from regulator 42. Reference chamber 62 can still remain at atmospheric pressure. Valve positioner devices to perform this function are also readily available to those skilled in the art and an example of one such system is that provided by Fisher, identified as Type 3582.

While the linkage system 46 between member 45 and weir gate 32 can take many forms, a preferred embodiment is illustrated in FIG. 2. Member 45 is connected to one corner of a first triangular linkage plate 50. Plate 50 is rotatably mounted on one side to a stationary structure at point 51. A second corner 52 is linked directly to weir gate 32 by vertical linking member 53. The remaining corner, 54, is linked to a second triangular linkage plate 55, at a first corner 56, by crosslinking means 57. Linking plate 55 is pivotally mounted at a second corner 58 to a stationary structure and is connected at a third corner, 59, to weir gate 32 by a second vertical linking means 60.

As can be seen by looking at FIG. 2, movement of actuator member 45 in a downward position causes first linking plate 50 to rotate in a clockwise direction about to the point 51. This motion then moves first vertical linking means 53 in an upward direction and causes part of weir gate 32 to be pulled upward. Crosslinking means 57 causes plate 55 to be rotated in a counterclockwise direction about pivot point 58 so that second vertical linking means 60 is also displaced upward to pull the remaining part of weir gate 32 upward. The shape of triangular linking plates 50 and 55 and the relative distances between the corners of triangular linking plates 50 and 55 and their respective pivot points can be varied to achieve the particular mechanical advantage necessary for pneumatic actuator 44 to move weir gate 32.

One problem which can be encountered with moving weir gate 32 by such a comparatively small actuating system is that the pressure of the water within compartment 19 of weir box 16 against weir gate 32 creates excessive frictional drag against stationary plate 34 which requires more force than is available through pneumatic actuator 44 to move weir gate 32. To minimize this problem, baffles 61 can be installed on stationary well 34 on the side facing weir gate 32, so that water can accumulate between the two and act to equalize the pressure on both sides of weir gate 32, which enables actuator 44 to more easily position weir gate 32.

A horizontal baffle 65 can be installed along the top of stationary plate 34 along the side facing weir gate 32 to act as a seal to minimize water flow between weir gate 32 and stationary wall 34.

While a particular embodiment of this invention has been shown and described, it is obvious that changes and modification can be made without departing from the true spirit and scope of the invention. It is the intention of the appended claims to cover all such changes and modifications.

The invention claimed is:

1. In a separation tank for separating pollutants from influent water and having:
   (a) an inlet for the influent water to flow into the tank;
   (b) means for removing the pollutants floating to the upper surface of the liquid enclosed in the tank;
   (c) means for removing the pollutants settling on the bottom of the tank;
   (d) means for collecting pollutant free water from the tank; and
   (e) a weir box for receiving the pollutant free water for discharge from the tank, the weir box having a weir gate system for controlling the liquid level within the air flotation tank; an automatic liquid level control system for operating the weir gate so that the liquid level within the tank is maintained at a predetermined level, said level control system comprising:
   (f) a stilling well located on the sidewall of the tank so that the liquid level within the stilling well is the same as that in the tank;
   (g) means for sensing the liquid level within the stilling well;
   (h) means, responsive to the sensing means, for producing an output air pressure signal with the pressure related to the liquid level within the stilling well;
   (i) means for producing a linear displacement related to the air pressure produced by the air pressure producing means; and
   (j) means for linking the weir gate to the means for producing a linear displacement so that the weir gate is moved to vary the flow of water from the tank in response to the liquid level changing in the tank, for maintaining a predetermined liquid level within the tank.

2. The system recited in claim 1, wherein the air pressure producing means comprises:
   (a) a source of air pressure; and
   (b) an air pressure regulator receiving the air pressure from the air pressure source and producing an output air pressure signal related to the liquid level within the stilling well.

3. The system recited in claim 1, wherein the linear displacement producing means is a pneumatic operator.

4. The system recited in claim 3, wherein the pneumatic operator comprises;
   (a) means defining a reference chamber having a reference pressure;
   (b) means defining an actuation chamber; and
   (c) movable means separating the reference chamber and the actuation chamber so that a linear displacement of the movable means is accomplished when a differential pressure between the chambers is produced.

5. The system recited in claim 1, wherein the linking means comprises:
   (a) means, responsive to the linear displacement from the linear displacement producing means, for moving part of the weir gate in a predetermined direction; and
   (b) means, responsive to the movement of the means for moving part of the weir gate, for moving the remainder of the weir gate in the predetermined direction.

6. The system recited in claim 5, wherein the first means comprises:
   (a) a first rotatable linking plate;
   (b) a linking member connected at one end to the linear displacement producing means and rotatably connected at the other end to the first linking plate at a given distance from the point of rotation for the plate;
   (c) a first weir gate linking member connected at one end to the weir gate and rotatably connected at the other end to the first linking plate at a given distance from the point of rotation for the plate, so that movement of the linking member causes the first linking plate to rotate and move the weir gate; and
   the second means comprises:
   (d) a second rotatable linking plate; modifications
   (e) crosslinking means rotatably connected at one end to the first linking plate and rotatably connected at the other end to the second linking plate, at a given distance from the respective point of rotation for each linking plate; and
   (f) a second weir gate linking member connected at one end to the weir gate and rotatably connected at the other end to the second linking plate at a given distance from the point of rotation for the plate, so that rotation of the first linking plate causes the second linking plate to rotate and move the weir gate.

7. The system recited in claim 1, further comprising means for equalizing the fluid pressure on both sides of the weir gate so that lateral friction is reduced to permit easier vertical movement of the weir gate.

8. The system recited in claim 7, wherein the equalizing means comprises a plurality of baffles mounted on the side of the stationary plate facing the weir gate so that the water in the weir box can collect on both sides of the weir gate to equalize the lateral pressures.

9. In a liquid storage container having a means for controlling the flow of liquid out of the container, an automatic liquid level control system for operating the controlling means so that the liquid level within the container is maintained at a predetermined level, said level control system comprising:
   (a) a stilling well located on the sidewall of the container so that the liquid level within the stilling well is the same as that in the container;
   (b) means for indicating the liquid level within the stilling well;
   (c) means, responsive to the indicating means, for producing an output air pressure signal with the pressure related to the liquid level within the stilling well;
   (d) means for producing a linear displacement related to the air pressure produced by the air pressure producing means;
   (e) means for linking the controlling means to the means for producing a linear displacement so that the controlling means is moved to vary the flow of water from the container in response to the liquid level changing in the container, for maintaining a predetermined liquid level within the container;
   wherein the controlling means is a weir gate and wherein the linking means comprises:
   (i) means, responsive to the linear displacement from the linear displacement producing means, for moving part of the weir gate in a predetermined direction, and including:
      (a) a first rotatable linking plate;
      (b) a linking member connected at one end to the linear displacement producing means and rotatably connected at the other end to the first linking plate at a given distance from the point of rotation for the plate;

(c) a first weir gate linking member connected at one end to the weir gate and rotatably connected at the other end of the first linking plate at a given distance from the point of rotation for the plate, so that movement of the linking member causes the first linking plate to rotate and move the weir gate; and (ii) means, responsive to the movement of the means for moving part of the weir gate, for moving the remainder of the weir gate in the predetermined direction, and including:

(d) a second rotatable linking plate;

(e) crosslinking means rotatably connected at one end to the first linking plate and rotatably connected at the other end to the second linking plate, at a given distance from the respective point of rotation for each linking plate; and (f) a second weir gate linking member connected at one end to the weir gate and rotatably connected at the other end to the second linking plate at a given distance from the point of rotation for the plate, so that rotation of the first linking plate causes the second linking plate to rotate and move the weir gate.

* * * * *